(12) United States Patent
Ball

(10) Patent No.: US 6,308,385 B1
(45) Date of Patent: Oct. 30, 2001

(54) JEWELRY CLASP

(76) Inventor: Peter Franklin Ball, 930 N. Landin Rd., New Haven, IN (US) 46774

( * ) Notice: Subject to any disclaimer, the term of this patent is extended or adjusted under 35 U.S.C. 154(b) by 0 days.

(21) Appl. No.: 09/450,166

(22) Filed: Nov. 29, 1999

(51) Int. Cl.[7] .................................................. F16B 45/02
(52) U.S. Cl. ............................ 24/574.1; 24/375; 24/376; 24/599.1; 24/599.6; 24/600.9
(58) Field of Search ............................... 24/573.4, 573.3, 24/373, 375, 376, 598.9, 599.6, 600.9; 152/237, 241, 242; 59/93; 63/3.1, 4

(56) References Cited

U.S. PATENT DOCUMENTS

| 243,351 | | 6/1881 | Baton . |
|---|---|---|---|
| 617,081 | | 1/1899 | Conger . |
| 785,538 | * | 3/1905 | Barton . |
| 873,553 | * | 12/1907 | Johnson . |
| 947,764 | * | 1/1910 | Schartow . |
| 996,619 | * | 7/1911 | Cottrell . |
| 1,390,980 | * | 9/1921 | Budrow . |
| 1,461,306 | | 7/1923 | Campbell . |
| 1,535,060 | * | 4/1925 | Tirrill . |
| 1,540,030 | * | 6/1925 | Mestars . |
| 1,650,802 | * | 11/1927 | McLoughlin . |
| 2,677,677 | | 5/1954 | Hetz . |
| 2,791,016 | * | 5/1957 | Newman . |
| 3,367,157 | | 2/1968 | Woofter . |
| 3,621,651 | * | 11/1971 | Gillespie . |
| 3,905,069 | * | 9/1975 | Szomanski . |
| 3,988,813 | * | 11/1976 | Korcey, Jr. . |
| 4,193,278 | | 3/1980 | Martinez . |
| 4,382,319 | * | 5/1983 | Mendoza . |

FOREIGN PATENT DOCUMENTS

| 18530 | 3/1914 | (DK) . |
|---|---|---|
| 41785 | 8/1925 | (NO) . |

* cited by examiner

*Primary Examiner*—James R. Brittain
(74) *Attorney, Agent, or Firm*—Baker & Daniels

(57) ABSTRACT

A jewelry clasp with two ends for connecting to a necklace. A latch has an aperture in the periphery thereof and aligns with one of two apertures defined by the discontinuous periphery of the clasp. An actuator located on the latch is provided so as to move the latch. Once the latch aperture is aligned with one of the respective apertures in the clasp, a jump ring on the end of a necklace may be attached to an end of the clasp.

21 Claims, 4 Drawing Sheets

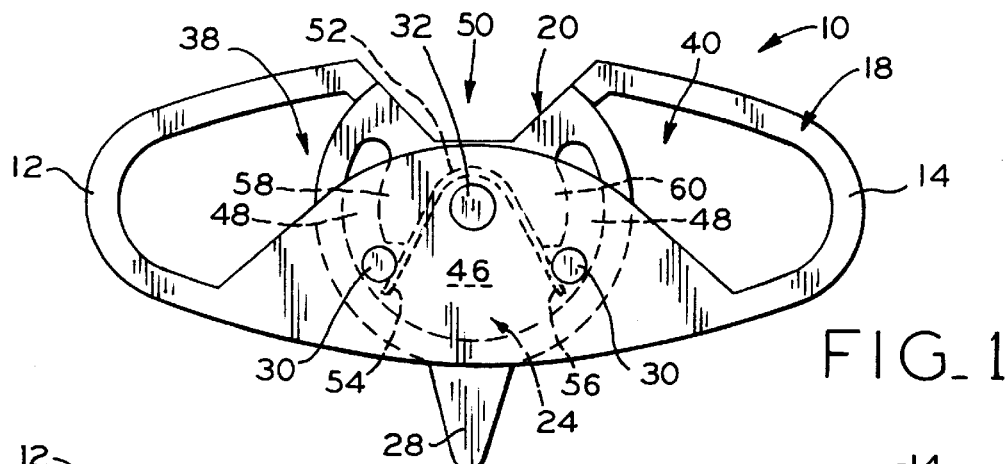
FIG_1
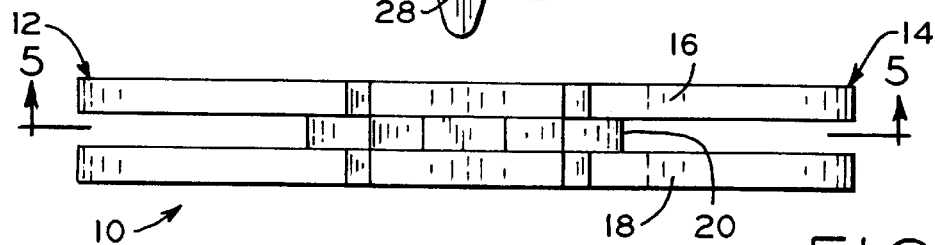
FIG_2
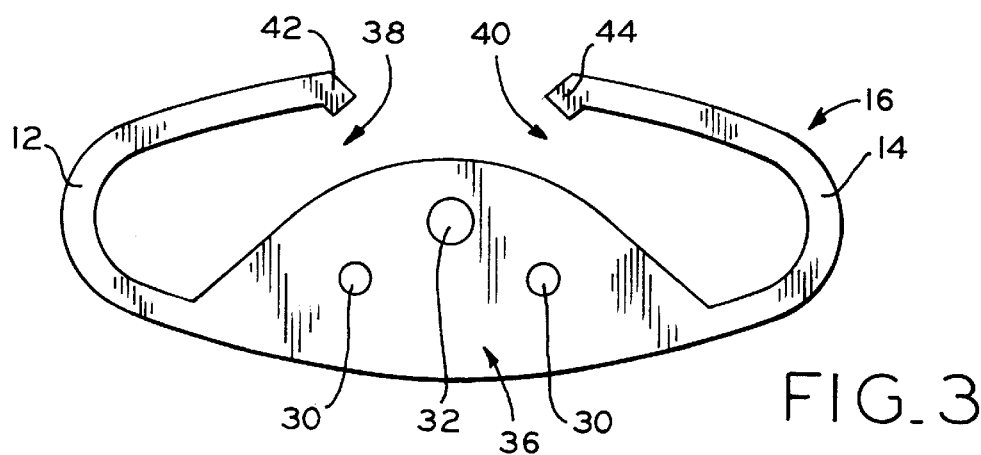
FIG_3
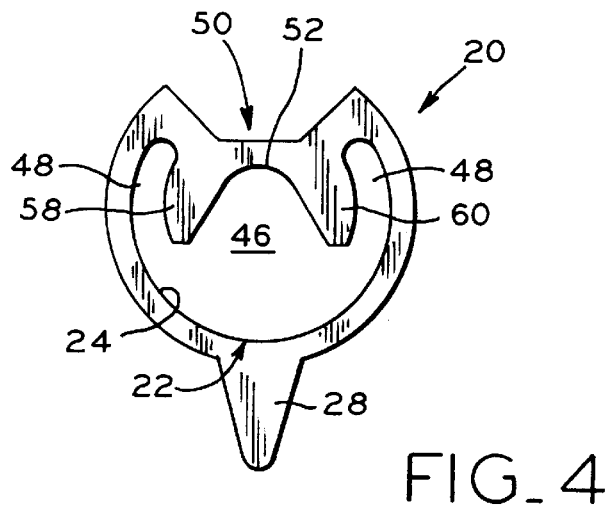
FIG_4

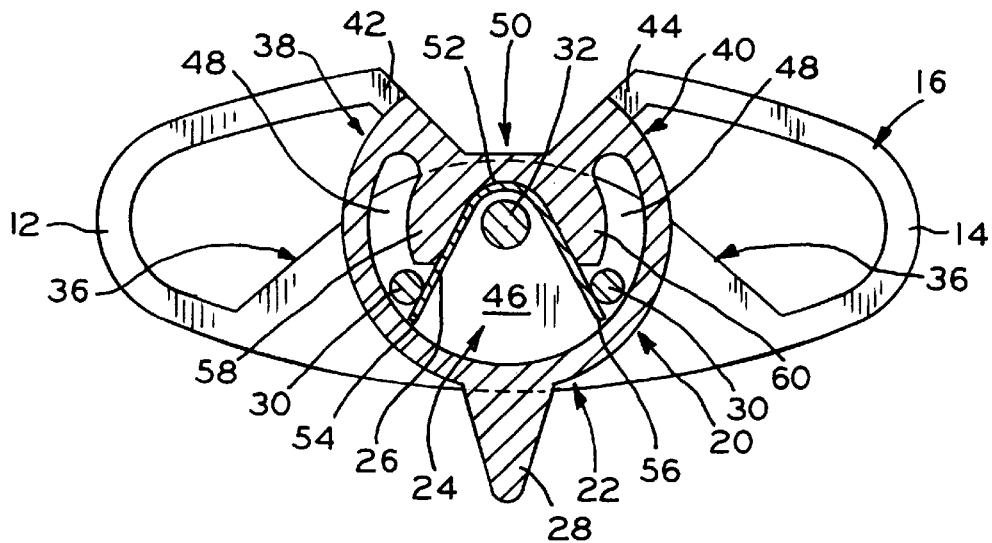
FIG_5
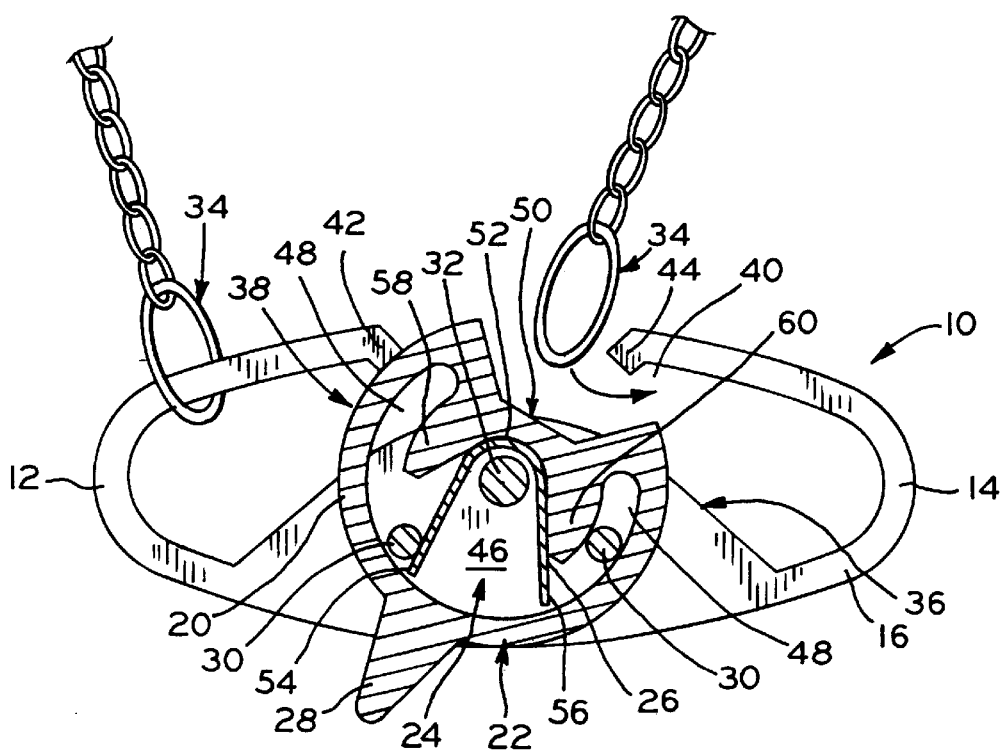
FIG_6

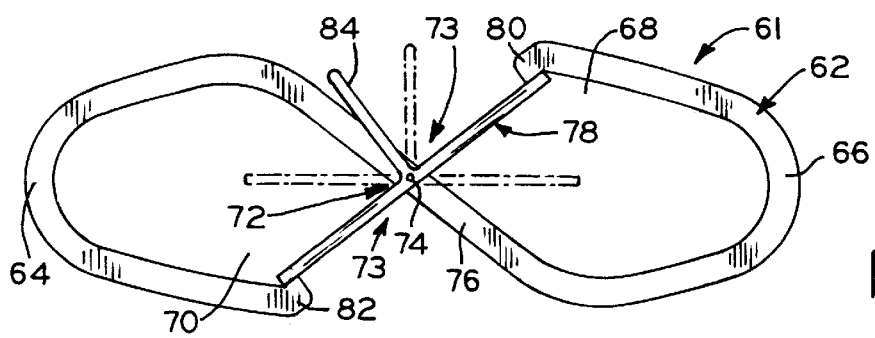
FIG_7
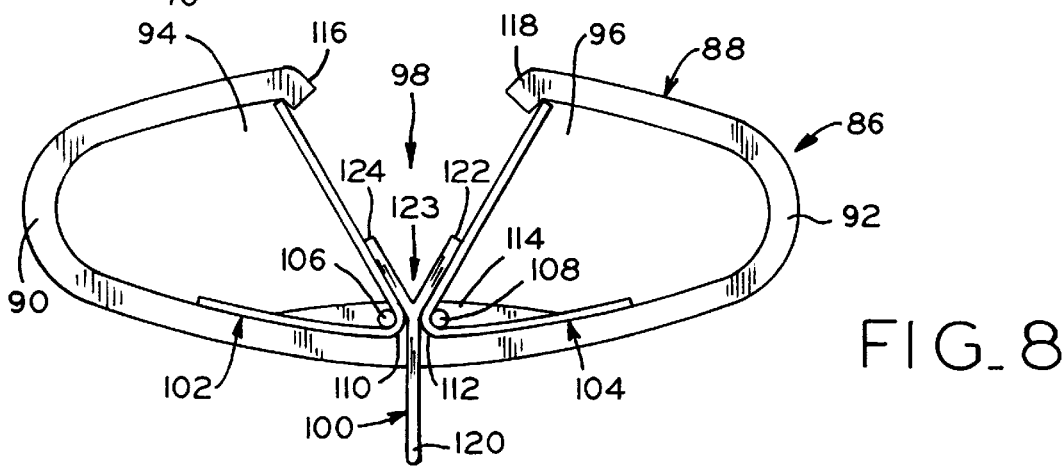
FIG_8
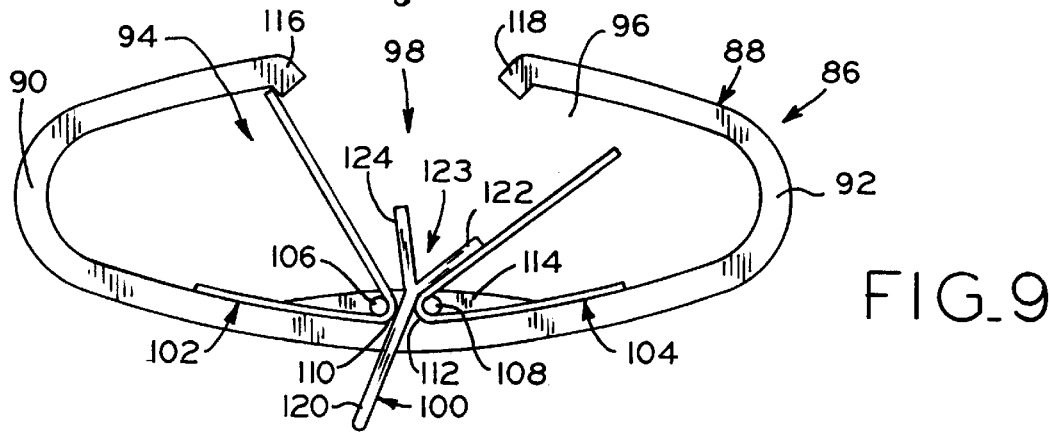
FIG_9
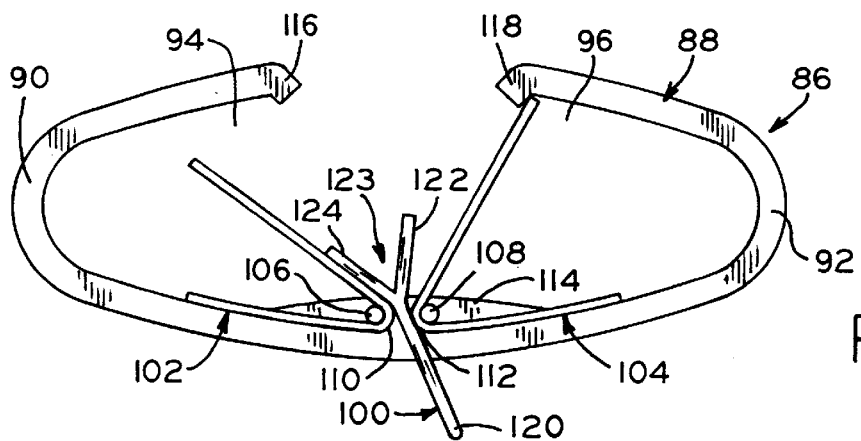
FIG_10

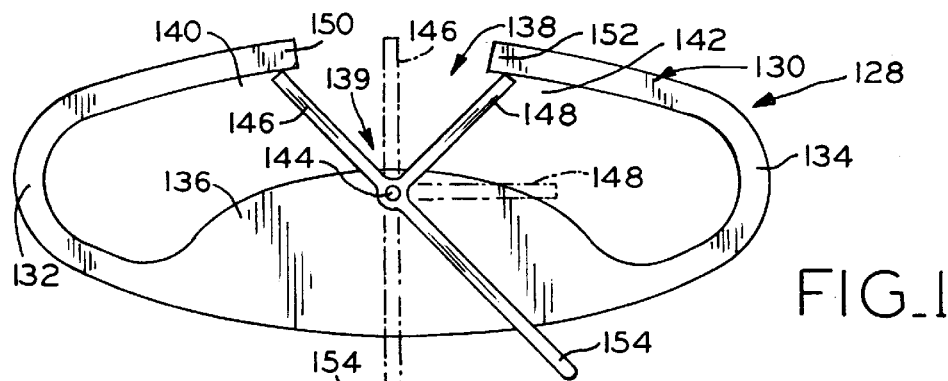
FIG_11
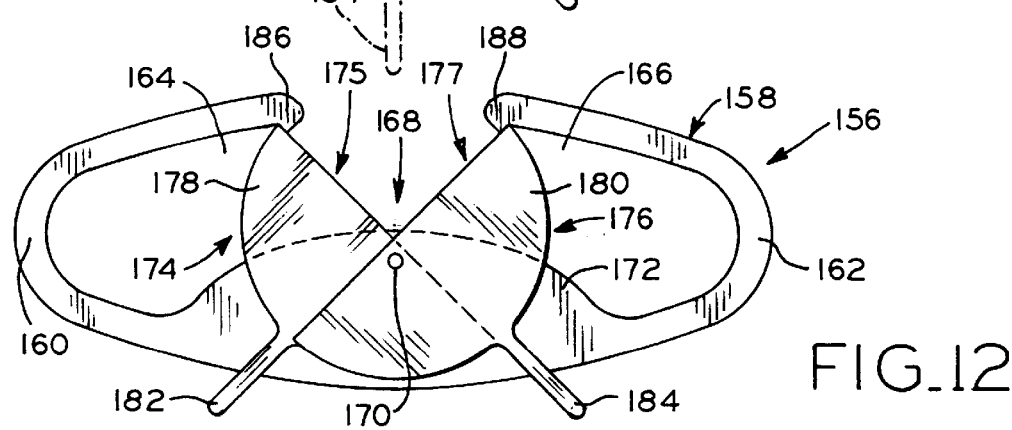
FIG_12
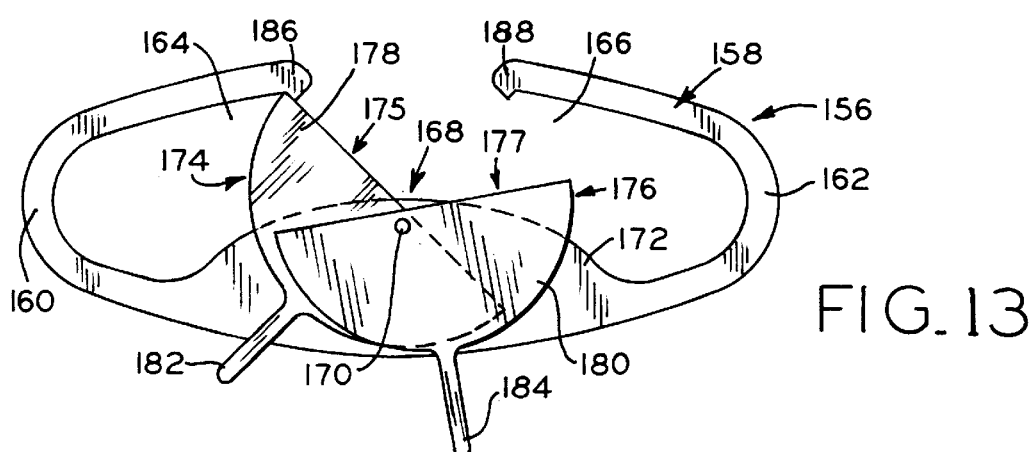
FIG_13
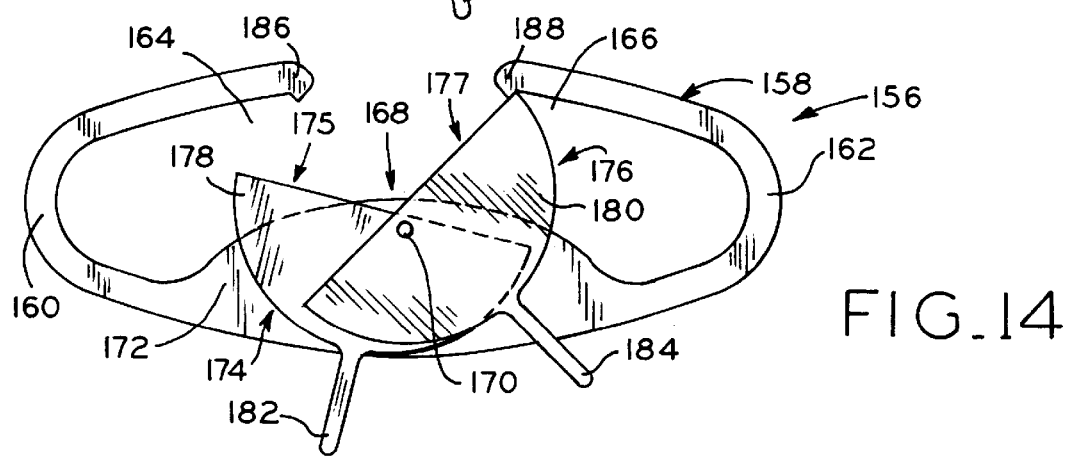
FIG_14

JEWELRY CLASP

BACKGROUND OF THE INVENTION

The present invention relates to a jewelry clasp for fastening necklaces and bracelets.

Jewelry clasps conventionally have a jump ring, or small ring, at the end of the necklace which is permanently secured to the clasp by soldering for example. The permanently attached jump ring is generally smaller than the detachable jump ring attached to the free end of the necklace. A problem with soldering the end of the necklace to the clasp is that if it breaks, the necklace has to be repaired by a jeweler, a time-consuming process.

Another problem with conventional clasps is that because of the size of the detachable jump ring at the free end of the necklace and the size of the clasp itself, pendants are permanently attached to the necklace. The detachable jump ring and the clasp are both too large to fit through the bale or loop through which the necklace extends. Thus, the pendant is not removable from the necklace unless the jump ring is removed or the chain breaks. The larger jump ring cannot be made smaller to alleviate this problem because the necklace would then become too difficult to fasten.

A jewelry clasp that allows for removing pendants from the necklace and is more easily repairable is desired.

SUMMARY OF THE INVENTION

The present invention provides a jewelry clasp having first and second apertures which are selectively engaged by a latch aperture of a latch, allowing for access to both ends of the clasp.

In one form thereof, the present invention provides a jewelry clasp having a first clasp portion including a discontinuous periphery. The first clasp portion defines first and second apertures and first and second ends of the clasp. The jewelry clasp further includes a latch having a latch aperture in the periphery thereof. The latch is movably connected to the first clasp portion for selectively enabling alignment of the respective first and second apertures with the latch aperture. When the latch aperture is aligned with the first aperture a link can be attached to one end of the clasp and when the latch aperture is aligned with the second aperture a link can be attached to the second end of the clasp.

In a preferred form, the jewelry clasp further includes a spring for maintaining the latch in a position such that the latch aperture is not aligned with the first or second apertures. An actuator is provided to move or pivot the latch. The first clasp portion has a pin extending therefrom for retaining the spring which is V-shaped. The latch includes a slot where the pin is disposed. The slot guides the latch as it pivots. The jewelry clasp further comprises a second clasp portion. The latch is disposed between the first and second clasp portions.

In another form thereof, the present invention provides a jewelry clasp having a first clasp portion including a discontinuous periphery. The first clasp portion defines first and second apertures. The jewelry clasp further includes a latch having a latch aperture located i the periphery thereof. A pin extends from the first clasp portion. A spring is disposed in the latch such that the end of the spring is located adjacent the pin. An actuator is provided for moving the latch such that when the latch is moved, the spring is compressed. A latch aperture in the periphery of the latch aligns with respective first and second apertures in the periphery of the first clasp portion such that a link may be attached to one side of the clasp.

In a preferred form, the pin of the spring biasing is located on the outside of the spring so as to retain the spring. The spring biasing further includes a post located adjacent the inside surface of the spring, at the apex of the spring. The spring biasing further includes a spring aperture in the latch. The spring allows the latch to be self centered.

In another form thereof, the present invention provides a jewelry clasp having first and second clasp portions. Each of the first and second clasp portions include a discontinuous periphery defining first and second apertures in each the first and second clasp portions. A latch having a latch aperture in the periphery thereof is also provided. The latch further includes an actuator for moving the latch to align the latch aperture respectively with the first and second aperture so that a link may be attached to the clasp.

In a preferred form, the jewelry clasp further includes a spring operatively connected with the latch for self-centering the latch. A pin is attached to the first and second clasp portions so as to retain the spring. The spring compresses as the latch is moved by the actuator which pivots the latch.

The advantages of the jewelry clasp include the versatility of having both sides of the clasp accessible so that both ends of the necklace are free. One end of the necklace can have a smaller jump ring than the other so that pendants are removable from the necklace and interchangeable. If the clasp becomes damaged, the whole jewelry clasp can be replaced rather than having to be repaired.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a side elevation of a jewelry clasp which embodies the present invention;

FIG. 2 is a top plan view of the jewelry clasp of FIG. 1;

FIG. 3 is a side elevation of the first clasp portion of the jewelry clasp of FIG. 1;

FIG. 4 is a side elevation of the latch of the jewelry clasp of FIG. 1;

FIG. 5 is a cross-sectional view of the jewelry clasp taken along line 5—5 of FIG. 2;

FIG. 6 shows the jewelry clasp of FIG. 5 with the latch pivoted so as to accept the links of the necklace;

FIG. 7 is a side elevation of a second embodiment of the jewelry clasp of the present invention;

FIG. 8 is a side elevation of a third embodiment of the jewelry clasp of the present invention;

FIG. 9 is a side elevation of the jewelry clasp of FIG. 8 with the latch pivoted in a first direction so as to accept the necklace;

FIG. 10 is a side elevation of the jewelry clasp of FIG. 8 with the latch pivoted in a second direction so as to accept the necklace;

FIG. 11 is a side elevation of a fourth embodiment of the jewelry clasp of the present invention;

FIG. 12 is a side elevation of a fifth embodiment of the jewelry clasp of the present invention;

FIG. 13 is a side elevation of the jewelry clasp of FIG. 12 with a first latch pivoted so as to accept the necklace;

FIG. 14 is a side elevation of the jewelry clasp of FIG. 12 with a second latch pivoted so as to accept the necklace.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PRESENT INVENTION

Referring to FIGS. 1 through 4, jewelry clasp 10 having first end 12 and second end 14, includes first clasp portion 16, second clasp portion 18, latch 20 and spring biasing element 22. Jewelry clasp 10 can be made from metals commonly used for jewelry such as precious metals or plated metal. As shown in FIG. 2, jewelry clasp 10 is assembled such that latch 20 is disposed between first clasp portion 16 and second clasp portion 18. Spring biasing element 22 includes spring aperture 24 located in latch 20, spring 26 and actuator 28 (FIGS. 1 and 4). Referring to FIGS. 1, 5 and 6, spring 26 is V-shaped and disposed within spring aperture 24 located in latch 20. The outside surfaces of ends 54 and 56 of spring 26 are located adjacent to pins 30 which extend from first clasp portion 16. Post 32 is located adjacent to the inside surface of spring 26 at apex 52.

Referring to FIG. 3, first clasp portion 16 is provided with first end 12 and second end 14 to which links or jump rings 34 attach. Pins 30, located on the outside surface of spring 26 for retaining spring 26, and post 32 are disposed on portion 36 of first clasp portion 16. First clasp portion 16 has a discontinuous periphery so as to define first aperture 38 and second aperture 40 providing first arm 42 and second arm 44. Links 34, in the form of loops, fit through apertures 38 and 40 such that arms 42 and 44 extend through links 34. Second clasp portion 18 is substantially identical to first clasp portion 16 having a discontinuous periphery to define first aperture 38 and second aperture 40. Second clasp portion 18, however, is provided with apertures (not shown) for receiving pins 30 and post 32.

Latch 20 is provided with spring aperture 24 in the center thereof as shown in FIGS. 4, 5 and 6. Spring aperture 24 includes larger portion 46 for accommodating spring 26 and slots 48 that extend upwardly from the bottom of portion 46, following the contour of latch 20 (FIG. 4). Pins 30 are disposed at the lower ends of slots 48 adjacent to the outside surface of spring 26. Pins 30 slide through slots 48 when latch 20 is actuated so as to guide latch 20 as it moves or pivots (FIGS. 1, 5 and 6). Latch 20 is also provided with latch aperture 50 located in the periphery thereof and is pivotally connected to first clasp portion 16 for enabling alignment with first aperture 38 and second aperture 40. Post 32 extends through large portion 46 of spring aperture 24 at apex 52 of spring 26 (FIGS. 5 and 6).

As shown in FIG. 5, spring biasing element 22 of jewelry clasp 10 maintains latch 20 in a position such that latch aperture 50 is not aligned with either first aperture 38 or second aperture 40. In other words, spring 26 of spring biasing element 22 allows latch 20 to be self-centered. If the operator releases actuator 28 while latch 20 is moved from the centered position, ends 54 and 56 of spring 26 resting against pins 30 will bias latch 20 back to the position of FIG. 5.

Actuator 28 moves latch 20 for selectively aligning latch aperture 50 with respective first aperture 38 and second aperture 40. In order to attach link 34 to first end 12 of clasp 10, actuator 28 is pivoted counterclockwise about post 32. Portion 58 of latch 20 forces against spring 26 so that end 54 of spring 26 is compressed toward end 56 of spring 26 as latch 20 pivots. End 56 of spring 26 remains in contact with pin 30 as latch aperture 50 rotates toward first aperture 38, thereby aligning latch aperture 50 with first aperture 38. Arm 42 is then placed through link 34 and link 34 is aligned with first end 12 of clasp 10. For attaching link 34 at the opposite end of the necklace (not shown), actuator 28 is forced in the opposite direction so that latch 20 is rotated in a clockwise direction as shown in FIG. 6. Portion 60 of latch 20 forces second end 56 of spring 26 toward first end 54 of spring 26 which is in contact with pin 30. This allows latch aperture 50 to align with second aperture 40 so that arm 44 may be placed through link 34, thereby aligning link 34 with second end 14 of clasp 10. Although not shown, one link 34 may be smaller than the other so that link 34 may fit through the bale of a pendant allowing for the pendant to be removed from a necklace and be interchangeable. If clasp 10 should break or become damaged, jewelry clasp 10 may simply be replaced by the jeweler.

FIGS. 7–14 illustrate additional embodiments of jewelry clasp 10. These embodiments are assembled in the same manner as jewelry clasp 10 shown in FIG. 1 such that two clasp portions are secured to one another with a latch sandwiched therebetween.

Referring to FIG. 7, the second embodiment of the present invention includes jewelry clasp 61 having S-shaped clasp portion 62 with ends 64 and 66. S-shaped clasp portion 62 has apertures 68 and 70 formed therein for receiving links 34 of a necklace such as that shown in FIG. 6. Latch 72 having latch apertures 73 is pivotally mounted on pin 74 which is secured to straight section 76 of clasp portion 62. The position of pin 74 and thus latch 72 allows latch arm 78 to be centered between first arm 80 and second arm 82, thereby closing apertures 68 and 70 and retaining links 34 on jewelry clasp 61. Extending approximately perpendicularly from the midpoint of latch arm 78 at the point of attachment to pin 74 is actuator 84. Referring to FIG. 7, by pivoting latch 72 about pin 74 with actuator 84, latch 72 can be moved from the closed position shown in solid lines to the open position shown in dashed lines. In the open position, latch arm 78 is pivoted so that the ends of latch arm 78 are not in contact with either arm 80 or 82. Latch apertures 73 align with apertures 68 and 70 such that both apertures 68 and 70 are open and able to receive links 34.

Referring to FIG. 8, jewelry clasp 86 is a third embodiment of the present invention having clasp portion 88 with ends 90 and 92. Within clasp portion 88 are apertures 94 and 96 for receiving link elements 34 of a necklace. Latch 98 having extension 120, arms 122 and 124 and latch aperture 123 disposed therebetween, is provided for selectively opening either aperture 94 or aperture 96. Latch 98 includes Y-shaped actuator 100 which is disposed between V-shaped springs 102 and 104. Pins 106 and 108 are secured to large portion 114 located along the bottom, inside edge of clasp portion 88. Pins 106 and 108 are disposed against the inside surface of springs 102 and 104 at apexes 110 and 112. Springs 102 and 104 are held in a closed position by the lower edge of clasp portion 88 and arms 116 and 118 in which actuator 100 is not compressing either spring 102 or spring 104.

Referring to FIG. 9, extension 120 of actuator 100 is forced left toward end 90 of clasp portion 88 such that latch aperture 123 aligns with aperture 96. Arm 122 of actuator 100 contacts spring 104, compressing spring 104 to open aperture 96 and allow link 34 to be aligned with end 92 of clasp portion 88. As shown in FIG. 10, when actuator 100 is forced right toward end 92 of clasp portion 88, latch aperture 123 aligns with aperture 94. Arm 124 of actuator 100 contacts spring 102, compressing spring 102 to open aperture 94 of jewelry clasp 86. This allows link 34 to be aligned with end 90 of clasp 86. To return jewelry clasp 86 to a position wherein apertures 94 and 96 are closed (FIG. 8), actuator 100 is released. Springs 102 and 104 return to the closed position which forces actuator 100 back to the centered position of FIG. 8.

FIG. 11 illustrates a fourth embodiment of the jewelry clasp of the present invention. Jewelry clasp 128 includes clasp portion 130 having ends 132 and 134. Jewelry clasp 128 has apertures 140 and 142 therein which are closed by latch 138. Latch 138 having latch aperture 139 is rotatably mounted on pin 144 which extends from large portion 138 of clasp portion 130. Latch 138 includes substantially perpendicular closing arms 146 and 148 with latch aperture 139 located therebetween. Closing arms 146 and 148 engage arms 150 and 152 of clasp portion 130 to close apertures 140 and 142. Actuator 154 is an extension of closing arm 146, continuing from pin 144 toward the bottom of clasp portion 130. With latch 138 in the position shown in solid lines in FIG. 11, apertures 140 and 142 are in the closed position. By forcing actuator 154 toward end 132 of clasp portion 130, actuator 154 and closing arm 146 become substantially vertical, thereby aligning latch aperture 139 with aperture 142. Apertures 140 and 142 are then open to receive links 34 of a necklace as shown in phantom lines in FIG. 11.

FIGS. 12, 13 and 14 illustrate jewelry clasp 156 of the fifth embodiment. Clasp 156 includes clasp portion 158 which is similar to clasp portion 130 of the previous embodiment. Clasp portion 158 further includes ends 160 and 162 as well as apertures 164 and 166 for receiving links 34 of a necklace. Latch 168 is rotatably mounted about pin 170 that is secured to large portion 172 of clasp portion 158. Latch 168 includes two closure elements 174 which defines latch aperture 175 and 176 which defines latch aperture 177. Closure elements 174 and 176 include semicircular portions 178 and 180 having actuators 182 and 184 protruding from the rounded edge thereof. In the closed position shown in FIG. 12, closure elements 174 and 176 contact arms 186 and 188 of clasp portion 158.

When opening aperture 166 as shown in FIG. 13, actuator 184 of closure element 176 is pushed toward end 160 of clasp portion 158, thereby rotating closure element 176 about pin 170. This movement of closure element 176 aligns latch aperture 177 with aperture 166, opening aperture 166 such that link 34 may be aligned with end 162. Closure element 174 remains in a closed position while closure element 176 is being actuated. In order to open aperture 164, actuator 182 is forced toward end 162 of clasp portion 158, thereby rotating closure element 174 about pin 170. With closure element 176 remaining closed, latch aperture 175 of closure element 174 aligns with aperture 164, thereby opening aperture 164 so that link 34 may be aligned with end 160 of clasp 156.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A jewelry clasp comprising:
   a first clasp portion including a discontinuous periphery and including first and second ends of said periphery, said first and second periphery ends forming respective first and second apertures with another portion of said periphery, and thereby defining first and second ends of said clasp; and
   a latch, said latch defining an aperture, said latch movably connected to said first clasp portion for selectively enabling alignment of said respective first and second apertures with said latch aperture, whereby, when said latch aperture is aligned with said first aperture, a link can be attached to the first end of said clasp without further movement of said latch and, when said latch aperture is aligned with said second aperture, a link can be attached to the second end of said clasp without further movement of said latch.

2. A jewelry clasp comprising:
   a first clasp portion including a discontinuous periphery and defining first and second apertures and defining first and second ends of said clasp;
   a latch, said latch defining an aperture, said latch movably connected to said first clasp portion for selectively enabling alignment of said respective first and second apertures with said latch aperture, whereby when said latch aperture is aligned with said first aperture a link can be attached to one end of said clasp and when said latch aperture is aligned with said second aperture a link can be attached to the second end of said clasp; and
   a spring for maintaining said latch in a position wherein said latch aperture is not aligned with either one of said first and second apertures.

3. The jewelry clasp of claim 1 further comprising an actuator for moving said latch.

4. The jewelry clasp of claim 1 wherein said latch pivots.

5. The jewelry clasp of claim 2 wherein said first clasp portion has a pin extending therefrom for retaining said spring.

6. A jewelry clasp comprising:
   a first clasp portion including a discontinuous periphery and defining first and second apertures and defining first and second ends of said clasp;
   a latch, said latch defining an aperture, said latch movably connected to said first clasp portion for selectively enabling alignment of said respective first and second apertures with said latch aperture, whereby when said latch aperture is aligned with said first aperture a link can be attached to one end of said clasp and when said latch aperture is aligned with said second aperture a link can be attached to the second end of said clasp; and
   a V-shaped spring for maintaining said latch in a position wherein said latch aperture is not aligned with either one of said first and second apertures.

7. The jewelry clasp of claim 5 wherein said latch includes a slot, said pin disposed in said slot to guide said latch as it pivots.

8. The jewelry clasp of claim 1 further comprising a second clasp portion, said latch disposed between said first and second clasp portions.

9. A jewelry clasp comprising:
   a first clasp portion including a discontinuous periphery and defining first and second apertures;
   a latch, said latch defining a latch aperture;
   a stop extending from said first clasp portion;
   a spring operatively associated with said latch, whereby an end of said spring is located adjacent to said stop; and
   an actuator for moving said latch such that when said latch is moved, said spring is compressed, whereby said latch aperture aligns respectively with one of said first and second apertures such that a link may be attached to said clasp.

10. The jewelry clasp of claim 9 wherein said stop is located adjacent the outside surface of said spring.

11. The jewelry clasp of claim 10 wherein said stop retains said spring.

12. The jewelry clasp of claim 9 further comprising a post disposed at the apex of said spring.

13. The jewelry clasp of claim 12 wherein said post is disposed adjacent the inside surface of said spring.

14. The jewelry clasp of claim 9 further comprising a spring aperture in said latch.

15. The jewelry clasp of claim 9 wherein said spring allows said latch to be self-centered.

16. A jewelry clasp, comprising:

first and second clasp portions, each of said first and second clasp portions including a discontinuous periphery defining first and second ends of said periphery, said first and second periphery ends defining respective first and second apertures in each of said first and second clasp portions; and a latch having a latch aperture in the periphery thereof, said latch disposed between said first and second clasp portions, said latch further including an actuator for moving said latch to thereby align said latch aperture respectively with said first and second apertures, whereby a link may be attached to said clasp without further movement of said latch.

17. A jewelry clasp comprising:

first and second clasp portions, each of said first and second clasp portions including a discontinuous periphery defining first and second apertures in each of said first and second clasp portions;

a latch having a latch aperture in the periphery thereof, said latch disposed between said first and second clasp portions, said latch further including an actuator for moving said latch to thereby align said latch aperture respectively with said first and second apertures, whereby a link may be attached to said clasp; and a spring operatively connected with said latch for self-centering said latch.

18. The jewelry clasp of claim 17 further comprising a pin attached to said first and second clasp portions.

19. The jewelry clasp of claim 18 wherein said pin retains said spring.

20. The jewelry clasp of claim 17 wherein said spring compresses as said latch is moved.

21. The jewelry clasp of claim 20 wherein said latch is pivotable and said actuator pivots said latch.

* * * * *